United States Patent

[11] 3,630,359

| [72] | Inventors | Pei Tai Pan;<br>Hugh McCauley Harper, both of Beloit, Wis. |
|---|---|---|
| [21] | Appl. No. | 844,911 |
| [22] | Filed | July 25, 1969 |
| [45] | Patented | Dec. 28, 1971 |
| [73] | Assignee | Fairbanks Morse Inc.<br>New York, N.Y. |

[54] MULTIPLE-DRUM INTERCEPTOR
25 Claims, 3 Drawing Figs.

[52] U.S. Cl. .................................................. 210/73,
210/77, 210/326, 210/329, 210/357
[51] Int. Cl. ........................................................ B01d 33/06
[50] Field of Search .......................................... 210/67, 73,
77, 152, 326, 329, 357

[56] References Cited
UNITED STATES PATENTS
| 1,538,742 | 5/1925 | Price ............................ | 210/329 |
| 2,228,185 | 1/1941 | Thompson ..................... | 210/357 X |
| 3,526,589 | 9/1970 | Meller et al. .................. | 210/77 |

*Primary Examiner*—Samih N. Zaharna
*Attorney*—Petherbridge, O'Neill & Lindgren

ABSTRACT: There is disclosed herein a novel system for the phased separation of the solid and liquid fractions of a solid-liquid sewage waste mixture disposed at a point contiguous to the point of origin of the mixture and between the point of origin and point of final treatment of the mixture. More particularly, there is provided a series of rotatable drum interceptors for intercepting and sequentially separating the solid fractions from the liquid fractions of a solid-liquid sewage mixture before substantial dissolution or disintegration of the solid fractions can occur whereby the resulting solid fractions are substantially separated from the liquid fractions and more readily disposed of separately from the liquid fractions.

INVENTORS.
PEI TAI PAN
HUGH McCAULEY HARPER

BY Petherbridge, O'Neill & Lundgren

ATTORNEYS.

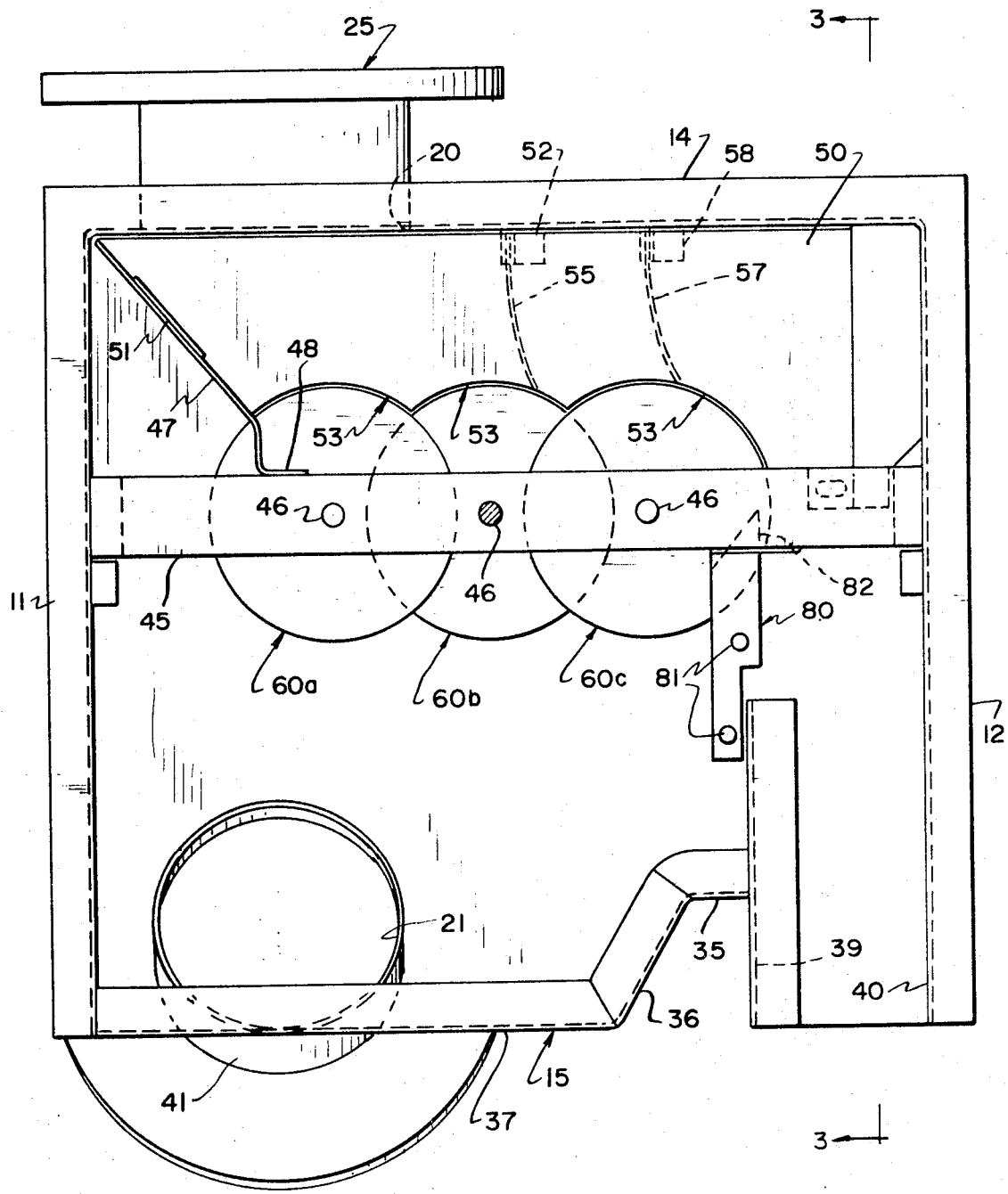

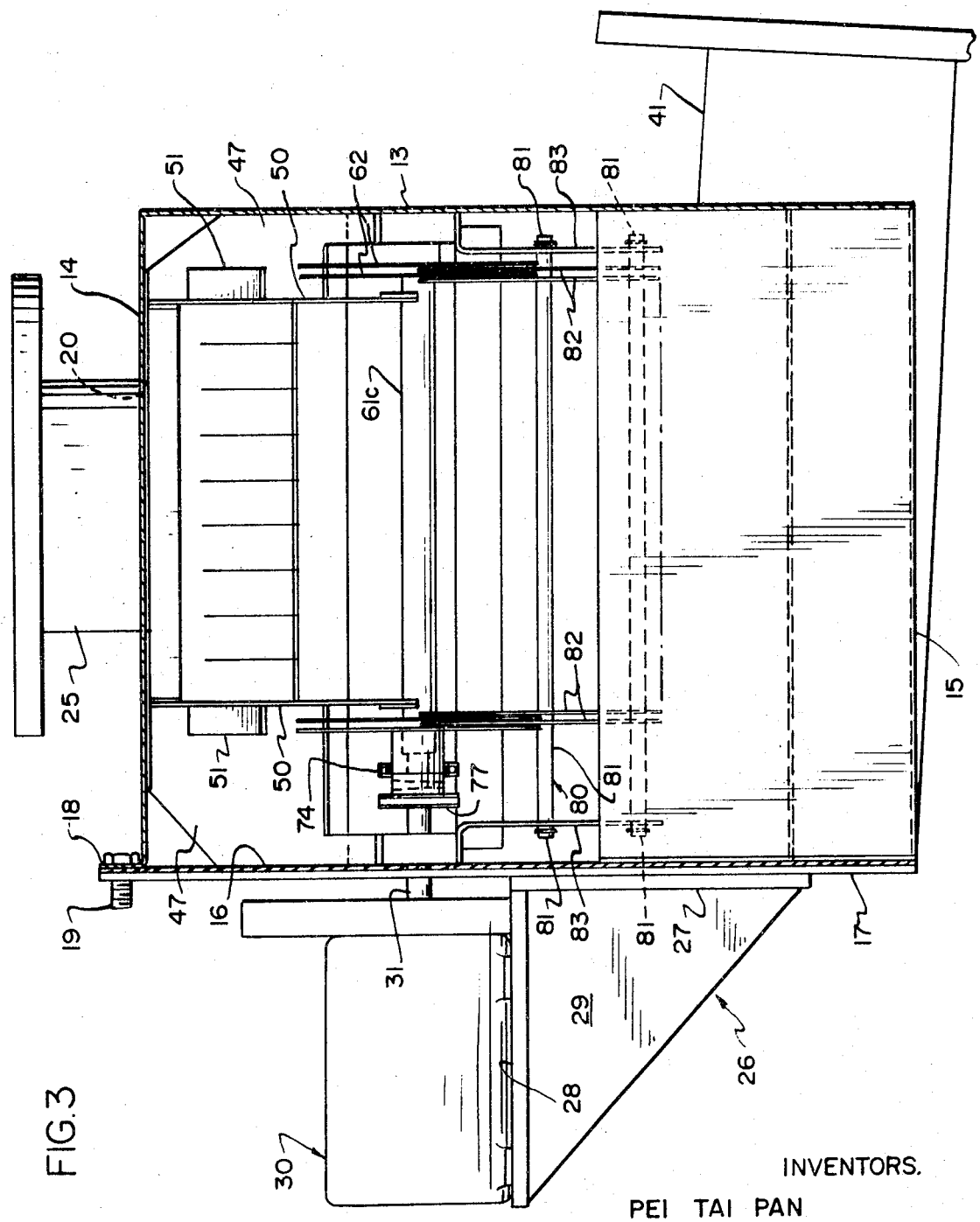

MULTIPLE-DRUM INTERCEPTOR

This invention is directed to a novel system for the interception and phased separating of the solid fractions from the liquid fractions of a solid-liquid sewage waste mixture before substantial dissolution, disintegration, or suspension of the solid fractions can occur whereby the resulting solid fractions are substantially separated from the liquid fractions.

Generally, a sewage waste mixture is transported from the point of origin thereof to an ultimate treatment facility, such as a municipal treatment plant, where treatment first commences. Normally, the first step in the treatment process is to separate the larger solid particles from the mixture by coarse screening in order to prevent clogging and damage to the treatment equipment. Next, the mixture is allowed to stand in sedimentation tanks in order to achieve further separation of the solid fractions from the liquid fractions. Although some use has been made of fine screening techniques to achieve such further separation, this technique has not been particularly successful due to the poor performance and high maintenance requirements of such screening devices. Finally, other well-known treatment devices and processes are utilized in order to dispose of the solid materials and purify and return the resulting water to the municipal water system, or otherwise dispose of the liquid effluent.

An additional problem which affects the separation of solid materials from the liquid carrier therefor is the distance of the treatment facilities from the point of origin of the sewage waste mixture. Most usually, the treatment facilities are located far distant from the point of origin of the sewage waste mixture. As a result, the waste mixture must be transported quite a long distance before the separation of solid fractions from the liquid fractions may commence. As a result, the solid fractions tend to dissolve, disintegrate or become suspended in the liquid fractions thereby necessitating more expensive equipment as well as a longer period of time in order to affect separation and purification.

It has been found that the aforementioned problem can be greatly minimized by intercepting and separating the sewage mixture at a point contiguous to the point of origin of the mixture whereby the sewage mixture is intercepted and separated into the solid and liquid fractions thereof respectively. Immediately following separation, the separated solid and liquid fractions are disposed of separately. The separated liquid fractions are usually carried away for transportation to the main treatment facilities where further treatment and purification is effected. The separated solid fractions may either be collected and disposed of as by incineration or the like, or they may be collected and transported separately to the main treatment facilities for disposal at that point.

Various systems have been designed for intercepting and separating a sewage mixture adjacent or contiguous to the point of origin thereof. In the pending application Ser. No. 634,012 of Floyd H. Meller, Pei-Tai Pan and Charles L. Swanson, filed on Mar. 9, 1967 for Solids Interception System, now U.S. Pat. No. 3,526,589 there is disclosed a system for intercepting and separating a sewage mixture at a point adjacent or contiguous to the point of origin thereof. Briefly described, the system includes a housing or chamber in fluid communication with the point of origin of the sewage mixture, wherein a rotatable drum or endless belt interceptor is disposed. As the sewage mixture flows into the housing, it strikes against the interceptor member which is in motion. Since the system is disposed contiguous to the point of origin of the sewage mixture, the solid matter usually has not had sufficient time to dissolve or disintegrate in the liquid fractions. As a result, when the sewage mixture falls onto the interceptor member, the solid fractions are retained on the drum or the belt while the liquid fractions either pass through or flow away from the interceptor member. As the interceptor member moves, the solid fractions are carried to a collection chamber and deposited therein for subsequent disposal, either by incineration or transportation to another point for disposal.

The above-described system is particularly adapted to include an incinerator device disposed to receive the separated solid fractions from the interceptor member and wherein the solid fractions are reduced to ashes by burning in order to dispose of these materials. In this connection, it was found that the above-described system does not operate at maximum efficiency for the reason that the solid fractions contain a high moisture content whereby proper burning is inhibited. As a result, it has been difficult to attain complete or even substantially complete disposal of the solid fractions thereby requiring further steps to complete the disposal of this material.

It is therefore a principal object of this invention to provide an improved sewage interception and separation system wherein the moisture content of the resulting separated solid fractions is greatly reduced by substantially separating the solid fractions from the liquid fractions.

Another object of this invention is to provide a system for phased separation of the solid and liquid fractions of a solid-liquid sewage mixture which includes a sewage mixture carrying conduit and means for intercepting and separating the sewage mixture disposed adjacent to the point of origin of the sewage mixture and including a plurality of movable intercepting and separating means for intercepting and sequentially separating the solid fractions of the sewage mixture from the liquid fractions thereof whereby the resulting solid fractions are substantially free from carried over portions of liquid fractions.

In connection with the foregoing object, it is yet another object of this invention to provide a system for phased separation of the solid and liquid fractions of a solid-liquid sewage mixture wherein the intercepting and separating means includes a plurality of movable interceptor members positioned in fluid interception relationship with respect to the sewage mixture, each of the interceptor members being disposed in substantially linear relationship with respect to one another and in intimate communication with the next adjacent interceptor, and means for moving the interceptors for moving the solid fractions restrained thereon sequentially from one member to the next and finally to a terminal point whereby the liquid fraction carryover and therefore the moisture content of the resulting solid fractions is substantially reduced.

Still another object of this invention is to provide a system of the type set forth wherein each interceptor member comprises a drum rotatably disposed in fluid communication with the point of origin of the sewage mixture, and having a plurality of axially aligned spaced-apart discs mounted on a shaft centrally disposed therethrough which is, in turn, mounted to provide rotational movement for the discs.

Yet another object of this invention is to provide a system of the type set forth which further includes deposition means for receiving the substantially filtered solid fractions from the rotatable drums.

Another object of this invention is to provide a system of the type set forth which further includes an inlet baffle for directing the solid-liquid sewage mixture into impacting relation with the first rotatable drum, and at least one splash control flap spaced from the inlet baffle, disposed adjacent to the top end of the receiving means and extending downwardly over the drums for preventing liquid carryover as the solid and liquid fractions of the sewage mixture are separated.

Still another object of this invention is to provide a process for phased separating of the solid and liquid fractions of a solid-liquid sewage waste mixture including providing a plurality of intercepting and separating means for the sewage waste mixture spaced from the point of origin of the mixture a distance which is insufficient to permit appreciable dissolution, suspension or disintegration of the solid fraction in the liquid fraction intercepting the sewage waste mixture, separating the solid fraction from the liquid fraction by sequentially transferring the solid-liquid sewage mixture from one interceptor and separating means to the next whereby the solid fractions are restrained on the interceptor and separating means while the liquid fractions continually gravitate away from the intercepting and separating means until the solid fractions are substantially separated and filtered, collecting the substantially filtered solid fractions from the intercepting and separating means and separately discharging the liquid fractions.

These and other objects of this invention, and further features of the invention pertain to the particular arrangement of the parts and method whereby the above-outlined and additional operating features thereof are attained.

The invention both as to its organization and method of operation, together with further objects and advantages thereof, will best be understood by reference to the following specification taken in connection with the accompanying drawings, in which:

FIG. 2 is a side elevational view of the housing and drums mounted therein and showing the inlet port and outlet port of the housing taken in the direction of the arrows along the line 2—2 in FIG. 1;

FIG. 3 is an end elevational view of the housing and terminal drum taken in the direction of the arrows along the line 3—3 in FIG. 2.

Figure 1:
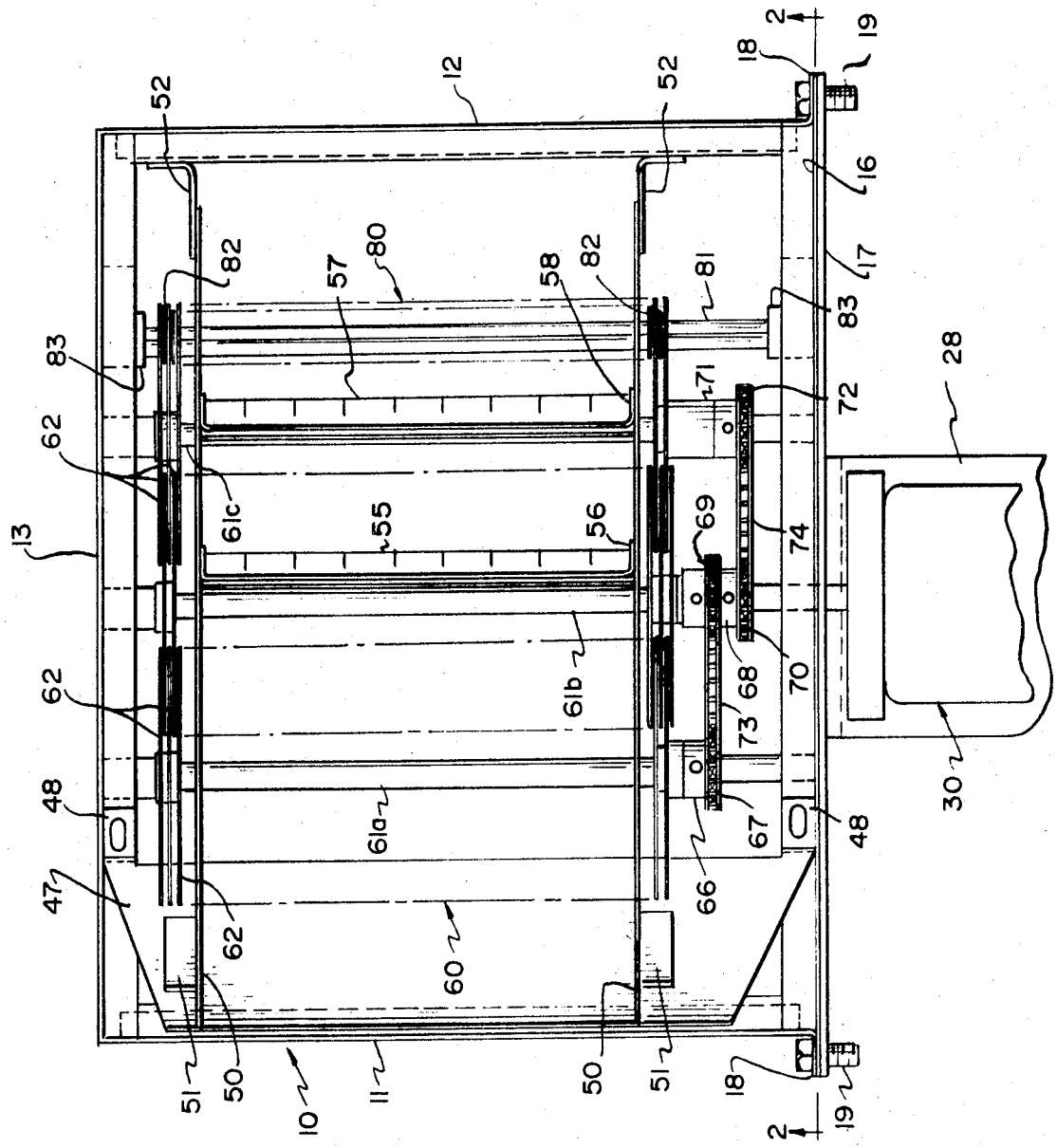
FIG. 1 is a top cross-sectional view showing the housing and the interceptor and separating drums rotatably mounted therein.

The novel system for phased separation of the solid and liquid fractions of a solid-liquid sewage waste mixture described herein generally includes a housing assembly 10 and three drums units (generally designated at 60) rotatably mounted within the housing for receiving and separating the solid and liquid fractions respectively of a solid-liquid sewage waste mixture.

Referring more particularly to FIG. 1, there is illustrated a housing 10 which is a substantially completely enclosed structure defined by a pair of sidewalls 11 and 12 respectively, an end wall 13, a top wall 14 and bottom wall 15, (FIGS. 2 and 3) and the outer surface 16 of a support structure 17. Each of the sidewalls 11 and 12 respectively, includes an out-turned flange 18 having an aperture therein (not shown) for mounting the housing 10 to the support structure 17, by means of threaded bolts 19. The top wall 14 is provided with an inlet port 20 (FIGS. 2 and 3) and a sewage waste mixture carrying conduit 25 mounted thereon and in fluid communication with the inlet port 20 at its lower end and in fluid communication with the source of origin of the sewage waste mixture at its upper end. The support structure 17, carries a motor mount 26, including a mounting wall 27, a support platform 28, and a reinforcing web 29. The support platform 28 provides a surface for carrying a motor 30, including an output shaft 31, having one end thereof rotatably mounted in the motor 30, and the other end thereof extending through an aperture (not shown) in the support structure 17.

In the embodiment illustrated in FIG. 2 of the drawings, the end wall 13, is shown to include a discharge port 21, disposed therein adjacent the bottom wall 15, for receiving and carrying the separated liquid fractions away from the housing 10. The bottom wall 15 consists of a mounting section 35, a steeply downwardly inclined section 36, and level section 37, being slightly inclined toward the discharge port 21 in the end wall 13. An inner end wall 39, is mounted between the respective sidewalls 11 and 12, and having the mounting section 35 of the bottom wall 15 mounted on the inner surface thereof. The inner end wall 39 is disposed in vertical alignment, spaced from and parallel to the end wall 13 thereby to form a solids discharge conduit 40 therebetween.

In the embodiment illustrated in FIG. 3, there is further illustrated the liquid fractions carrying pipe 41 extending angularly away from the housing 10. The pipe 41 is connected to the discharge port 21 at its one end for receiving the separated liquid fractions therein, and is connected to the ultimate destination for the separated liquid fractions at its other end, or alternatively, the pipe 41 may be attached to any other intermediary receptacle or vessel for receiving the separated liquid fractions along its route to the ultimate disposal situs.

The housing 10, further includes a pair of support bars 45 (FIG. 2) extending horizontally between and mounted on the respective sidewalls 11 and 12 respectively, the support bars 45, being parallel and in horizontal alignment with respect to one another. Each support bar 45 includes three apertures 46 disposed therethrough, the apertures 46 in the respective support bars 45, being in horizontal alignment. An inlet baffle 47, is provided in the housing 10, extending diagonally between the juncture of the sidewall 11 with the top wall 14 adjacent the inlet port 20 and the support bars 45, and extending horizontally between the support structure 17 and the end wall 13. The inlet baffle 47 includes a pair of out-turned flanges 48 at the lower end of the sides thereof for mounting the lower end of the inlet baffle 47 to the support bars 45. The lower edge of the inlet baffle 47 is thereby disposed immediately adjacent to the outer periphery of the first drum unit 60 to effectively direct the sewage waste mixture into impacting relation with the drum units 60. A pair of enclosure walls 50 are mounted within the housing 10, each extending vertically between the respective support bar 45 and the top wall 14 and horizontally between the inlet baffle 47 and the opposing sidewall 11. Each enclosure wall 50 includes an out-turned flange 51, adjacent its one end for mounting the enclosure wall 50 on the inlet baffle 47. The opposing end of the enclosure wall 50, is mounted on the opposing sidewall 11, by means of a mounting bracket 52 (FIG. 1). The lower side edges of each enclosure wall 50 are sculptured, as indicated at 53, for a purpose to be described hereinafter.

The housing 10 further includes a first splash control flap 55 mounted on the lower surface of the top wall 14 by means of a mounting block 56, approximately intermediate the respective sidewalls 11 and 12 respectively, and extending downwardly whereby the lower edge of the flap 55 is in slight contact with the outer periphery of the respective drum unit 60. A second splash control flap 57 is similarly mounted on the lower surface of the top wall 14 by means of a second mounting block 58 and similarly extends downwardly inside the housing 10 until the lower edge thereof is in slight contact with the respective drum unit 60. The function of each of the splash control flaps 55 and 57 respectively will be described hereinbelow.

The housing 10 is further provided with a series of three drums 60a, 60b and 60c (the drums being generally designated by the numeral 60) rotatably mounted therein. Each drum 60 comprises a square shaft 61 having a plurality of parallel and axially aligned discs 62 disposed along the length of the shaft 61. The discs 62 are each fixedly mounted to the shaft 62 whereby rotational movement of the shaft 61 imparts rotational movement to the discs 62 mounted thereon.

A series of three drums 60a, 60b and 60c, of the type described above, are provided within the housing 10, and having the respective shafts 61a, 61b and 61c, thereof rotatably mounted between the opposed support bars 45 through the corresponding apertures 46 in the support bars 45 such that the discs 62 of each of the respective drums 60 are disposed in meshed relationship with the discs 62 of the adjacent drum 60.

Each of the shafts 61 of each of the drums 60 is provided with conventional sprocket gears including a hub and setscrew assembly. More specifically, the shaft of the first drum 60a is provided with a cylinder 66 carrying a series of sprockets 67 arranged around the periphery thereof and adjacent the outer end of the cylinder 66. The shaft 61 of the second drum 60b is similarly provided with a second cylinder 68 mounted on the end thereof and carrying a second series of sprockets 69 arranged around the periphery thereof and in substantially horizontal alignment with the first sprockets 67 carried by the first drum 60a. In addition, the second cylinder 67 carries a third series of sprockets 70 spaced outwardly from the second sprockets 69 adjacent the outer end of the second cylinder 68. The shaft 61 of the third drum 60c is similarly provided with a third cylinder 71 mounted on the end thereof and carrying a fourth series of sprockets 72 arranged around the periphery thereof and in substantially horizontal alignment with the third series of sprockets 70 on the second cylinder 68. The first and second sprockets 67 and 69 respectively are interconnected by a first endless chain 73, which engages the sprockets 67 and 69 in mating relationship. The third and fourth sprockets 70 and 72, respectively, are interconnected by a second endless chain 74 which similarly engages the sprockets 70 and 72 in mating relationship. The shaft 61 of the second drum 60b is connected to the output shaft 31 of the motor 30 through a coupling 77. When the motor 30, is energized, the output shaft 31, is caused to rotate at a predetermined speed, which, in turn, causes the shaft 61 and the second cylinder 68 of the second drum 60b to rotate. The rotational movement of the shaft 61 of the second drum 60b, is transferred to the shafts 61 of the first and third drums, 60a and 60c respectively, through the first and second endless chains 73 and 74 respectively, thereby to cause the rotational movement of all three drums 60a, 60b and 60c respectively, at the same predetermined speed and in the same direction.

In operation, the housing assembly 10 is disposed in close proximity to the source of origin of a solid-liquid sewage waste mixture. A solid-liquid sewage waste mixture is then discharged into the conduit 25 and directed through the inlet port 20 in the housing 10. The diagonal inlet baffle 47 directs the mixture into impacting relation with the first drum 60a, which is disposed immediately below the inlet port 20. The motor 30, which may be energized in any of the several methods known, such as trip switches, impact sensitive switches, and the like, causes rotational movement of the output shaft 31 which, in turn, imparts this rotational movement to the shaft 61 of the second (or middle) drum 60b. The rotational movement is transferred to the first and third drums 60a and 60c respectively, by means of the sprocket and chain assembly as described above. In the preferred embodiment, the motor 30 is caused to run continuously while the system is operational thereby avoiding the need of energizing the motor 30 just prior to the entry of a sewage waste mixture into the housing 10.

The solid-liquid waste mixture is then deposited upon the first drum 60a while it is rotating and initially confined between the inlet baffle 47 and the first splash control flap 55. The spacing between the discs 62 of the drum 60a enables the liquid fractions to flow downwardly therebetween to the bottom wall 15 of the housing 10, and due to the incline provided in the bottom wall 15, the liquid fractions are directed to the discharge port 21 and carried away. The solid fractions are retained upon the drum 60a and carried to the next successive drum 60b by the rotational movements of the drums 60 a, and 60b. The first splash control flap 55 is sufficiently flexible to permit the solid fractions passage thereunder to the next adjacent drum 60b. During this procedure, additional portions of liquid fractions are allowed to gravitate from the second drum 60b and be disposed of through the discharge port 21. As the partially filtered solid fractions are carried from the first drum 60a to the second drum 60b, the first splash control flap 55 and the enclosure walls 50 prevent the solid fractions from spilling over into the bottom of the housing 10. Further separation is achieved as the solid fractions are transported from the second drum 60b, to the third drum 60c thereby enabling additional portions of the liquid fractions to gravitate through the discs 62, to the bottom of the housing 10, and out the discharge port 21. Again, the enclosure walls 50 and the second splash control flap 57 prevent the solid fractions from spilling over into the bottom of the housing 10. At this point, the resulting solid fractions are substantially filtered.

As the third drum 60c continues to rotate the solid fractions are discharged into a receiving chamber in the form of a solids discharge conduit 40, as shown in FIG. 2 and carried away for subsequent disposal, such as by incineration whereby the solid fractions are disposed of separately from the liquid fractions to facilitate further sewage treatment. In the embodiment illustrated in FIG. 2, the discharge conduit 40 may preferably lead to an incinerator assembly (not shown) wherein the solid fractions are burned to ash. Since the solid fractions are substantially filtered and free of carried-over liquid fractions, the burning process is greatly facilitated whereby further treatment for the solid fractions is obviated. Alternatively, the discharge conduit 40 may lead to a storage tank or transfer device (not shown) wherein the solid fractions are accumulated and subsequently transported to an incinerator. In either event, the solid fractions are disposed of separately from the liquid fractions, and such disposal is greatly facilitated due to the greater efficiency of separation achieved with the instant device.

The apparatus further includes a scraper assembly 80 consisting of a bar 81 mounted horizontally between brackets 83 mounted on the end wall 13 and the support structure 17 respectively, the scraper 80 having a plurality of finger members 82 mounted thereon, in spaced relation along the length of the bar 81 and arranged to be in meshed relationship with the discs of the third drum 60c. The finger members 82 of the scraper 80 thereby remove the solid matter, especially solid matter of a fibrous nature, adhering to the disc 62 of the third drum 60c. The scraper assembly 80 is mounted within the housing 10 at a point adjacent to and above the solid discharge conduit 40 whereby any solid material which is scraped from between the discs 62 will fall into the conduit 40.

While there has been described what is at present considered to be the preferred embodiments of the invention, it will be understood that various modifications may be made therein, and it is intended to cover in the appended claims all such modifications as fall within the true spirit and scope of the invention.

We claim:

1. A system for phased separation of the solid and liquid fractions of a solid-liquid sewage mixture comprising: a solid-liquid sewage mixture carrying conduit, means for intercepting and receiving the solid-liquid sewage mixture from said conduit at a point adjacent the point of origin of the sewage mixture including a plurality of movable and intermeshed intercepting and separating devices for intercepting and sequentially separating the solid fractions of the sewage mixture from the liquid fractions thereof and to substantially reduce the moisture content of the solid portion of mixture, said plurality of intermeshed intercepting and separating devices causing sequential transfer of said solids fractions from one of said devices to another to a final discharge point separate from a point of discharge of the separated liquid fractions, whereby the solid portions of the mixture may be substantially intercepted and separated from the liquid portions of the mixture and the moisture content of the solid portions substantially reduced before any major dissolution or disintegration of the solid portions of the mixture can occur.

2. The sewage-separating system as set forth in claim 1, wherein said solid-liquid sewage mixture carrying conduit includes an inlet port in communication with the point of deposition of the sewage mixture for receiving the solid-liquid sewage mixture therein, and an outlet port spaced from said inlet port for discharging the solid-liquid sewage mixture into said intercepting and separating means.

3. The sewage-separating system as set forth in claim 1, wherein said intercepting and separating means includes a housing having an inlet port in communication with said conduit outlet port and a discharge port in said housing spaced from said inlet port for discharging the separated liquid fractions from said housing.

4. The sewage-separating system as set forth in claim 3, which further includes a solids discharge conduit for receiving and separately disposing of the solid waste matter from the separating means.

5. The sewage-separating system as set forth in claim 1, wherein said intercepting and receiving devices include a plurality of movable intermeshed interceptors positioned in solid-liquid sewage waste receiving relationship with said conduit, each of said interceptors being disposed in substantially linear and intermeshed relationship with respect to the next adjacent interceptor, means for moving said interceptors to move the solids deposited thereon sequentially from the first interceptor located to secure said sewage mixture from said conduit to each next adjacent interceptor and finally to a terminal interceptor in order to permit the phased separation of the solid waste fraction from the liquid waste fraction thereby to reduce substantially the moisture content of the solid waste fraction.

6. The sewage-separating system as set forth in claim 5, wherein each of said interceptors comprises a drum rotatably disposed within said receiving means said drum having a shaft and a plurality of axially aligned spaced-apart discs disposed along the length of said shaft, said shaft extending between and centrally positioned on said discs and having the respective ends thereof extending outwardly beyond the outer surfaces of the terminal discs for rotatably mounting said drum.

7. The sewage-separating system as set forth in claim 6, wherein a first drum is disposed in intercepting and separating relationship with respect to said conduit, and wherein a terminal drum is disposed for depositing the solid waste matter separately from the liquid waste matter through a discharge means located adjacent said terminal drum.

8. A sewage-separating system for phased separating of the solid-liquid fractions of a solid-liquid sewage mixture to substantially reduce the moisture content of the solid fractions thereof between the point of origin of the sewage mixture and the point of final treatment of the sewage mixture comprising, a solid-liquid sewage mixture carrying conduit, receiving means connected to said conduit for intercepting and receiving the solid-liquid sewage mixture from said conduit at a point spaced from the point of origin of the sewage mixture and from the point of final treatment of the sewage mixture, said receiving means including deposition means for receiving solid waste matter discharged separately from the liquid waste matter and means for carrying the liquid waste matter away from said receiving means separately from the solid waste matter, a plurality of intermeshed drums rotatably disposed within said receiving means and having at least a first drum positioned in solid-liquid sewage waste receiving relationship with said conduit and a terminal drum positioned in depositing relationship with said deposition means, each of the drums being disposed in substantially linear intermeshed relationship with respect to the next adjacent drum, each of said drums including a shaft and a plurality of axially aligned spaced-apart discs mounted on said shaft along the length thereof, and means for rotatably moving said drums, whereby the solid-liquid sewage mixture enters said receiving means through said conduit and is intercepted by said first drum, the solid waste matter being retained upon said first drum while the liquid waste matter gravitates from said drum to the bottom of said receiving means, and the partially filtered solid matter then being transferred to the next adjacent drum by the rotational movement of said first drum whereupon additional portions of the liquid waste matter are permitted to gravitate from said drum, and the further-filtered solid waste matter ultimately being transferred to said terminal drum whereupon additional portions of the liquid waste matter are permitted to gravitate from said drum, and finally the substantially filtered solid waste matter being deposited in the deposition means by the rotational movement of said terminal drum.

9. The sewage-separating system as set forth in claim 8, wherein the discs of each of the respective drums are disposed in meshed relationship with the discs of the next adjacent drum thereby to provide a wiping action between the respective discs in adjacent drums.

10. The sewage-separating system as set forth in claim 9, wherein the receiving means further includes an inlet baffle angularly disposed adjacent to said conduit and extending across the breadth of said receiving means whereby the solid-liquid sewage mixture is directed into impacting relationship with said first drum.

11. The sewage-separating system as set forth in claim 10, wherein said receiving means further includes a flexible splash flap spaced from said inlet baffle and disposed adjacent to the top end of said receiving means and extending downwardly over and in slight contact with the periphery of the respective drum thereby substantially to confine the solid-liquid waste mixture initially between said inlet baffle and said splash flap.

12. A sewage-separating system for phased separating of the solid-liquid fractions of a solid-liquid sewage mixture to substantially reduce the moisture content of the solid fraction thereof between the point of origin of the sewage mixture and the point of final treatment of the sewage mixture comprising, a solid-liquid sewage mixture carrying conduit having a conduit inlet port in communication with the point of deposition of the waste matter for receiving the solid-liquid sewage mixture therein and a conduit outlet port spaced from said inlet port for discharging the solid-liquid sewage matter therefrom, a housing having an inlet port in communication with said conduit outlet port for receiving the solid-liquid sewage mixture therein and a discharge port spaced from said inlet port for discharging the filtered liquid therefrom, the housing further including a solids discharge conduit for receiving the solid waste matter therein, a plurality of intermeshed drums rotatably disposed within said housing and having at least a first drum positioned in solid-liquid sewage waste receiving relationship with said receiving port of said housing and a terminal drum in solid waste matter depositing relationship with respect to said solids discharge conduit, each of said drums being disposed in substantially linear intermeshed relationship with respect to the next adjacent drum to permit sequential transfer of said solid fractions from one drum to the next drum to said solids discharge conduit, each of said drums including a shaft and a plurality of axially aligned spaced-apart discs, disposed along the length of said shaft, and means for rotatably moving said drums, whereby a solid-liquid sewage mixture enters said housing through said inlet port and impacts against and in intercepted by the first drum disposed therebeneath, the solid fractions remaining on the drum which the liquid fractions gravitate from the drum between the respective discs thereof to the bottom of the housing, the partially filtered solid fractions then being transferred to a second drum by the rotational movement of said first drum whereupon additional portions of the liquid fractions are permitted to gravitate from said drum between the respective discs thereof to the bottom of the housing, and the further-filtered solid fractions finally being transferred to a terminal drum whereupon additional portions of the liquid fractions are permitted to gravitate from said drum between the respective discs thereof to the bottom of said housing, and finally the substantially filtered solid fractions being deposited in said solids discharge conduit by the rotational movement of said terminal drum thereby to permit the liquid fractions to be discharged from the housing through the discharge port and the solid fractions to be discharged from the housing separately in said solids discharge conduit.

13. A sewage-separating system as set forth in claim 12, wherein said second drum includes drive means for rotating said drum at a predetermined speed, said second drum being rotatably connected to the remaining drums in order to drive said drums in response to the rotating movement of said second drum.

14. A sewage-separating system as set forth in claim 13, wherein all of said drums rotate at the same predetermined speed, and in the same rotational direction.

15. A sewage-separating system as set forth in claim 13, wherein said drive means for said second drum includes a chain and sprocket assembly, which is, in turn, driven by a motor and the remaining drums are connected to said second drum by a series of additional chain and sprocket assemblies which are responsive to the rotational movement of said second drum.

16. A sewage-separating system for the phases separating of the solid-liquid fractions of a solid-liquid sewage mixture to substantially reduce the moisture content of the solid fraction thereof between the point of origin of the sewage mixture comprising, a solid-liquid sewage mixture carrying conduit having a conduit inlet port in communication with the point of deposition of the waste matter for receiving the solid-liquid sewage mixture therein and a conduit outlet port spaced from said conduit inlet port for discharging the solid-liquid sewage matter therefrom, a housing having an inlet port in communication with said conduit outlet port for receiving the solid-liquid sewage mixture therein and a discharge port spaced from said receiving port for discharging the filtered liquid therefrom, said housing including a solid discharge conduit for receiving the solid waste matter therein, the housing further including an inlet baffle angularly disposed adjacent to said inlet port and extending across the breadth of said housing, and a flexible splash flap spaced from said inlet baffle and disposed adjacent to the top end of said housing and extending downwardly to a point in approximate horizontal alignment with the lower end of said inlet baffle thereby substantially to confine the solid-liquid sewage mixture initially between said inlet baffle and said flexible splash flap, a plurality of intermeshed drums rotatably disposed within said housing and having at least a first drum positioned in solid-liquid sewage waste receiving relationship with said receiving port of said housing and a terminal drum in solid waste matter depositing relationship with respect to said solid discharge conduit, each of said drums being disposed in substantially linear intermeshed relationship with respect to the next adjacent drum to permit transfer of said solid fractions from each of said drums to the terminal drum and from the terminal drum to said solids discharge conduit, each of said drums including a shaft and a plurality of axially aligned space-apart discs disposed along the length of said shaft and means for rotatably moving said drums, whereby a solid-liquid sewage mixture enters said housing through the receiving port thereof and is directed by said inlet baffle into impacting relation with said first drum disposed adjacent to said receiving port the solid fractions remaining on said drum while the liquid fractions gravitate from the drum between the respective discs thereof to the bottom of said housing and the further-filtered solid fractions finally being transferred to a terminal drum whereupon additional portions of the liquid fractions are permitted to gravitate from said drum between the respective discs thereof to the bottom of the housing, and finally, the substantially filtered solid fractions being deposited in the solids discharge conduit by the rotational movement of said terminal drum thereby to permit the liquid fractions to be discharged from the housing through the discharge port and the solid fractions to be discharged through said solids discharge conduit.

17. A sewage-separating system as set forth in claim 16 wherein said discharge port is disposed adjacent the bottom of said housing.

18. A sewage-separating system as set forth in claim 17, wherein the bottom wall of said housing is sloped downwardly toward said discharge port.

19. A sewage-separating system as set forth in claim 16, wherein said housing includes a first drum rotatably disposed therein, a central drum in linear relationship with said first drum and having the discs thereof in meshed relationship with the discs of said first drum, and a terminal drum in linear relation with said central drum having the discs thereof in meshed relationship with the discs of said central drum.

20. A sewage-separating system as set forth in claim 19, wherein a first flexible splash flap is mounted on said housing disposed adjacent to the top end thereof and extending downwardly over and in slight contact with the periphery of said central drum, and a second flexible splash flap is mounted on said housing spaced from said first flexible splash flap and disposed adjacent to the top end thereof and extending downwardly over and in slight contact with the periphery of said terminal drum, said first and second flexible splash flaps being provided to reduce the carryover of the liquid fraction due to splashing as the solid fraction is moved across the respective drums by the rotational movement thereof.

21. The sewage-separating system as set forth in claim 16 which further includes a pair of enclosure walls mounted within said housing, one enclosure wall being disposed adjacent each side edge of respective drums and extending horizontally from said inlet baffle across to the opposing wall of said housing and vertically from a point adjacent the top wall of said housing downwardly to a point just above the upper periphery of said drums, each of said enclosure walls being sculptured to accommodate the circular periphery of each of said drums.

22. A process for phased separating of the solid and liquid fractions of a solid-liquid sewage mixture comprising, transporting a solid-liquid sewage mixture from a point of origin thereof to a point of interception thereof, disposing a plurality of movable intermeshed interceptor members in the path of the solid-liquid sewage mixture at a point spaced from the pint of origin thereof insufficient to permit appreciable dissolution, suspension and disintegration of the solid fractions in the liquid fractions during transit thereof, intercepting the solid-liquid sewage waste mixture with said plurality of interceptor members, moving the first interceptor member to initiate separation of the solid fractions from the liquid fractions of the mixture whereby the solid fractions are retained on the first interceptor member while the liquid fractions gravitate away from the interceptor member to partially filter the solid fractions, transferring the solid fractions to subsequent interceptor members by the movement of the interceptor members whereby the partially filtered solid fractions are retained on the subsequent interceptor members while additional portions of the liquid fractions gravitate away from the subsequent interceptor members to substantially filter the solid fractions, discharging the substantially filtered solid fractions from the terminal interceptor member into solids-receiving means, discharging the liquid fractions separately from the area of the interceptor members, whereby the substantially filtered solid fractions are essentially free of moisture and may be treated separately from the liquid fractions thereby to facilitate sewage waste treatment.

23. A process for phased separating of a solid-liquid sewage waste mixture as set forth in claim 22, wherein each of the interceptor members comprises a drum having a shaft and a plurality of axially aligned spaced-apart discs disposed along the length of said shaft, said shaft extending between and centrally positioned on said discs and having the respective ends thereof extending outwardly beyond the outer surfaces of said discs for rotatably mounting said discs in the path of the solid-liquid sewage mixture.

24. A process for phased separating of a solid-liquid sewage mixture as set forth in claim 23, wherein a first drum is provided in the path of the solid-liquid sewage mixture whereby the solid-liquid sewage waste mixture impacts thereagainst and the solid portions thereof are retained on the respective discs of the first drum while the liquid portions of the mixture gravitate away from said first drum to initially separate the solid fractions from the liquid fractions, a central drum is provided in linear relationship with the first drum and having the discs thereof in meshed relationship with the respective discs of the first drum, the first drum being movably responsive to the movement of said central drum whereby the solid fractions are transferred from the first drum to the central drum by respective movements thereof while additional portions of the liquid fractions gravitate away from the central drum to further filter the solid fractions, and a terminal drum is provided in linear relationship with said central drum and said first drum and having the discs thereof in meshed relationship with the discs of the central drum, the terminal drum being movably responsive to the movement of said central drum, whereby the solid fractions are transferred from the central drum to the terminal drum by the respective movements thereof while additional portions of the liquid fractions gravitate away from the terminal drum to substantially filter the solid fractions, and collection means provided in receiving relationship with said terminal drum to receive the substantially filtered solid fractions therein from said terminal drum.

25. A process for phased separating of a solid-liquid sewage mixture as set forth in claim 24, wherein a first splash flap is provided disposed immediately above said central drum to minimize the liquid fractions carryover as the solid fractions are transferred from said first drum to said central drum, and a second splash flap is provided disposed immediately above said terminal drum to further minimize the liquid fractions carryover as the solid fractions are transferred from said central drum to said terminal drum.

* * * * *